(12) United States Patent
Kanao

(10) Patent No.: US 9,016,323 B2
(45) Date of Patent: Apr. 28, 2015

(54) PIPELINE REGENERATION PIPE

(75) Inventor: Shigeki Kanao, Nishinomiya (JP)

(73) Assignee: Kanaflex Corporation, Osaka (JP)

( * ) Notice: Subject to any disclaimer, the term of this patent is extended or adjusted under 35 U.S.C. 154(b) by 0 days.

(21) Appl. No.: 13/808,991

(22) PCT Filed: Oct. 1, 2010

(86) PCT No.: PCT/JP2010/067257
§ 371 (c)(1),
(2), (4) Date: Jan. 8, 2013

(87) PCT Pub. No.: WO2012/014336
PCT Pub. Date: Feb. 2, 2012

(65) Prior Publication Data
US 2013/0112306 A1    May 9, 2013

(30) Foreign Application Priority Data
Jul. 26, 2010   (JP) .................................. 2010-166683

(51) Int. Cl.
| | | |
|---|---|---|
| *F16L 55/16* | (2006.01) | |
| *F16L 11/02* | (2006.01) | |
| *F16L 11/16* | (2006.01) | |
| *F16L 55/165* | (2006.01) | |
| *E03F 3/06* | (2006.01) | |

(Continued)

(52) U.S. Cl.
CPC .................. *F16L 11/02* (2013.01); *F16L 11/16* (2013.01); *F16L 55/1652* (2013.01); *F16L 55/1656* (2013.01); *E03F 3/06* (2013.01); *F16L 11/15* (2013.01); *F16L 11/24* (2013.01); *E03F 2003/065* (2013.01)

(58) Field of Classification Search
USPC .................. 138/97, 98, 122; 405/150.1, 184.2
See application file for complete search history.

(56) References Cited

U.S. PATENT DOCUMENTS

| 3,112,771 A | 12/1963 | Bringolf | |
|---|---|---|---|
| 3,890,181 A * | 6/1975 | Stent et al. ..................... | 156/143 |

(Continued)

FOREIGN PATENT DOCUMENTS

| CN | 1644971 | 7/2005 |
|---|---|---|
| CN | 101023226 | 8/2007 |

(Continued)

OTHER PUBLICATIONS

Office Action issued Apr. 24, 2013 in corresponding Chinese Application No. 201080029729.1 (with English translation).

(Continued)

*Primary Examiner* — James Hook
(74) *Attorney, Agent, or Firm* — Wenderoth, Lind & Ponack, L.L.P.

(57) ABSTRACT

A pipeline regeneration pipe, with which necessary strength can be ensured by way of the inserted regeneration pipe itself without the necessity of grouting, includes an inner wound flexible resin layer 5*d* which constitutes the inner layer of a straight pipe part 5*b*, an outer wound flexible resin layer 5*e* laminated on the outer surface of the inner wound flexible resin layer and constitutes the outer layer of the straight pipe part, and a protruded rim part 5*c* helically formed on the outer surface of the outer wound flexible resin layer, the protruded rim part 5*c* being configured by a rigid-resin core 5*g* helically wound, and a core-covering part 5*f* integrated with the outer wound flexible resin layer so as to surround the rigid-resin core.

11 Claims, 2 Drawing Sheets

(51) Int. Cl.
*F16L 11/15* (2006.01)
*F16L 11/24* (2006.01)

(56) References Cited

U.S. PATENT DOCUMENTS

| | | | |
|---|---|---|---|
| 4,490,575 A | 12/1984 | Kutnyak | |
| 4,754,781 A * | 7/1988 | Jan de Putter | 138/98 |
| 4,867,203 A * | 9/1989 | Putter | 138/98 |
| 5,074,943 A * | 12/1991 | Menzel | 156/195 |
| 5,791,378 A * | 8/1998 | Stephens | 138/98 |
| 5,899,237 A * | 5/1999 | Akedo et al. | 138/129 |
| 6,056,016 A * | 5/2000 | Rogers | 138/98 |
| 6,334,466 B1 * | 1/2002 | Jani et al. | 138/141 |
| 6,415,824 B2 * | 7/2002 | Stephens | 138/98 |
| 6,907,906 B1 * | 6/2005 | Cook et al. | 138/109 |
| 7,717,648 B2 | 5/2010 | Kanao | |
| 2003/0178083 A1 * | 9/2003 | McCaughtry | 138/133 |
| 2005/0163956 A1 | 7/2005 | Takashima et al. | |
| 2007/0175533 A1 * | 8/2007 | Herron et al. | 138/122 |
| 2007/0264085 A1 | 11/2007 | Kanao | |
| 2009/0301593 A1 * | 12/2009 | Zucchi et al. | 138/109 |

FOREIGN PATENT DOCUMENTS

| | | |
|---|---|---|
| DE | 21 41 281 | 3/1973 |
| JP | 3-7590 | 1/1991 |
| JP | 7-6586 | 1/1995 |
| JP | 8-200562 | 8/1996 |
| JP | 2002-38581 | 2/2002 |
| JP | 2004-176905 | 6/2004 |
| JP | 2005-195130 | 7/2005 |
| JP | 2006-83608 | 3/2006 |
| JP | 2008-25761 | 2/2008 |
| JP | 2009-144760 | 7/2009 |

OTHER PUBLICATIONS

International Search Report issued Dec. 21, 2010 in corresponding International Application No. PCT/JP2010/067257.
Office Action issued Nov. 8, 2011 in corresponding Japanese Application No. 2010-166683 (with English translation).
Office Action issued Dec. 27, 2011 in corresponding Japanese Application No. 2010-166683 (with English translation).
Office Action issued Sep. 6, 2013 in corresponding Chinese Application No. 201080029729.1, with English translation.
Full machine translation of JP 7-6586 (published on Jan. 31, 1995).
Office Action issued Jan. 15, 2014 in corresponding Chinese Application No. 201080029729.1, with English translation.
Extended European Search Report dated Dec. 9, 2014 issued in corresponding European Application No. 10855343.9.

* cited by examiner

PIPELINE REGENERATION PIPE

TECHNICAL FIELD

The present invention relates to a pipeline regeneration pipe inserted into a pipeline of any type, such as a sewer pipe, which has been buried in the ground and aged, so as to regenerate the pipeline.

BACKGROUND ART

In cases where a sewer pipe has been buried in soil for many years and aged to be deteriorated in load resistance capacity or water shutoff capacity, there arise problems such as collapse of a road surface and insufficient flow capacity.

In order to solve such problems, there has been proposed and embodied a method of repairing a drain pipe, in which an aged sewer pipe is used as a support and a new resin pipe is inserted thereinto to serve as a drain pipe.

There are various methods of repairing a drain pipe, including the pipe making method, for example, in which a rigid vinyl chloride member in a belt shape is supplied into a manhole, and the rigid vinyl chloride member in the belt shape, which is formed into a pipe shape at an inlet part of an existing pipe with use of a pipe forming machine, is inserted into the existing pipe.

There has been also known the so-called casing pipe construction method in which, in place of the rigid vinyl chloride member in the belt shape, short pipes smaller in diameter than an existing pipe are brought through a manhole and are sequentially connected to each other so as to be inserted into the existing pipe.

However, the pipe making method requires dedicated construction facilities such as the pipe forming machine, and construction in this method needs to be executed by a skilled mechanic. Although the casing pipe construction method does not require such a pipe forming machine, the pipes produced to be used in this method are large in size and thus cannot be easily handled in a narrow manhole. In addition, both of these construction methods require connection work upon forming into a pipe shape in an existing pipe, and such work takes long time in order to enhance sealing performance at the connected parts, which is problematic.

In view of the above, there has been recently proposed a construction method that realizes easy formation of a new pipeline in an existing pipe with no need for any dedicated construction facility. In this method, as shown in FIG. 5, a flexible regeneration pipe 50 having a helically-corrugated surface is fed from a rotary drum 51, is inserted into one end of an existing pipe 53 through a manhole 52, and is drawn through another end of the existing pipe 53 by means of a winch 54 (see Patent Document 1, for example).

In this figure, reference sign 55 denotes a cap attached to the tip of the regeneration pipe 50, and reference sign 56 denotes wire connected to the cap 55.

PRIOR ART DOCUMENT

Patent Document

Patent Document 1: JP-A-2002-38581

SUMMARY OF THE INVENTION

Problems to be Solved by the Invention

Nevertheless, flexibility is the prioritized property of the conventional regeneration pipe 50 in order that the regeneration pipe 50 can be easily inserted into the existing pipe 53 through the manhole 52 and then the tip of the regeneration pipe 50 can be easily pulled out of another manhole 52, which is connected with the former manhole 52, with use of the wire 56. Accordingly, the regeneration pipe 50 itself is not so strong against pressure. The gap between the existing pipe 53 and the inserted regeneration pipe 50, as well as a helical groove provided on the entire periphery in the entire length of the regeneration pipe 50, are grouted to be integrated with the existing pipe 53, so that the regeneration pipe 50 obtains certain strength. As a result, there was disadvantage of a long construction period.

The present invention has been achieved in view of the above problems of the conventional regeneration pipe, and provides a pipeline regeneration pipe that ensures desired strength by itself without the necessity of grouting.

Solutions to be Problems

The present invention provides a pipeline regeneration pipe, including:

an inner wound flexible resin layer configuring an inner layer of a straight pipe part;

an outer wound flexible resin layer laminated on an outer surface of the inner wound flexible resin layer and configuring an outer layer of the straight pipe part; and a protruded rim part helically formed on an outer surface of the outer wound flexible resin layer, wherein the protruded rim part is configured by a rigid-resin core helically wound, and a core-covering part integrated with the outer wound flexible resin layer so as to surround the rigid-resin core.

In the present invention, the inner wound flexible resin layer can be made of low-density polyethylene or medium-density polyethylene. In a case where oil resistance is required, it is possible to use linear low-density polyethylene.

In the present invention, the outer wound flexible resin layer can be made of thermoplastic elastomer blended with olefinic resin.

In the present invention, the rigid-resin core can be made of any one of PPS (polyphenylene sulfide), PEI (polyetherimide), PAR (polyarylate), PES (polyethersulfone), PEEK (polyether ether ketone), PTFE (polytetrafluoroethylene), PET (polyethylene terephthalate), PBT (polybutylene terephthalate), PA (polyamide), POM (polyacetal), saturated polyester, and polymer blends thereof.

In the present invention, the core-covering part is preferably made of a material same as that for the outer wound flexible resin layer.

Effects of the Invention

The pipeline regeneration pipe according to the present invention advantageously ensures necessary strength by means of the inserted regeneration pipe itself without the necessity of grouting.

DETAILED DESCRIPTION OF THE INVENTION

An embodiment of the present invention is described in detail below with reference to the drawings.

1. Structure of Drain Pipe

Figure 1:
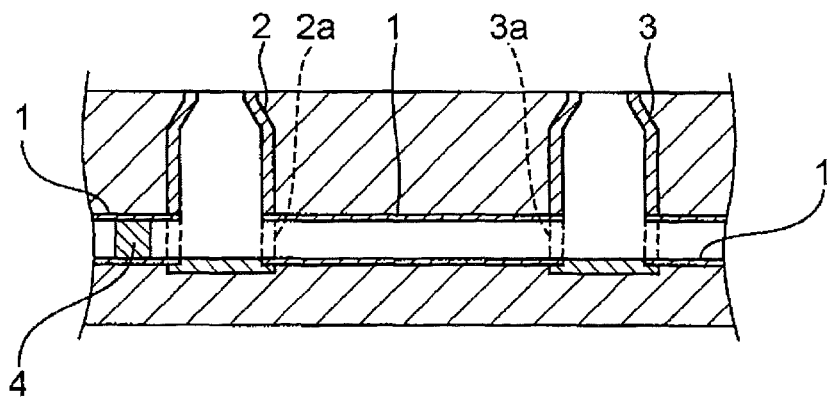
FIG. 1 is a vertical sectional view showing the structures of drain pipes to which a regeneration pipe according to the present invention is applied.

FIG. 1 shows the structures of existing drain pipes, to which a pipeline regeneration pipe (hereinafter, abbreviated as regeneration pipe) according to the present invention is applied, as well as the structures of manholes.

In this figure, a plurality of existing drain pipes 1 buried in soil are often made of concrete. The drain pipes 1 are each connected to openings 2a and 3a, which are respectively provided at lower ends of a left manhole 2 and a right manhole 3, for example, being located on a drain route.

Upon regeneration of one of the drain pipes 1, the drain pipe 1 is inspected preliminarily to check if there is no difficulty in insertion of a regeneration pipe. The drain pipe 1 is washed if necessary, in which case a water shutoff valve 4 is attached.

2. Method of Inserting Regeneration Pipe

Figure 2:
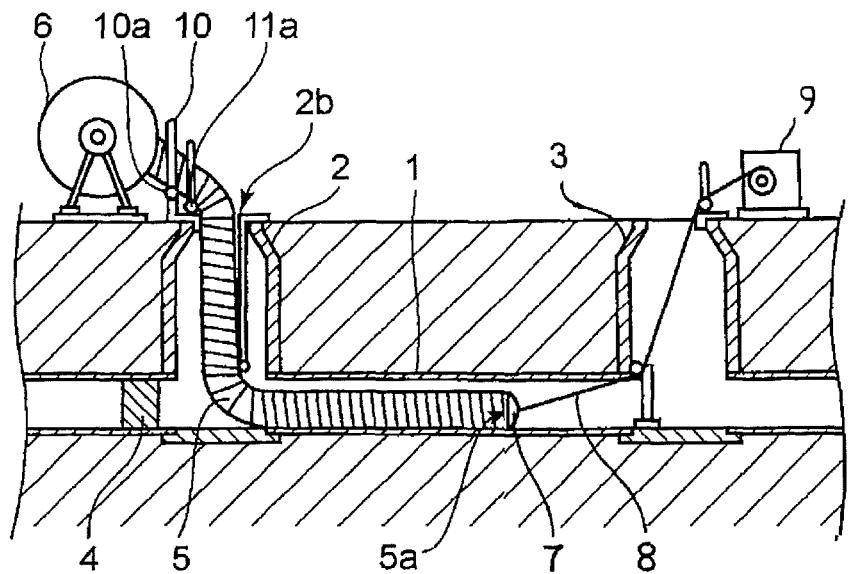
FIG. 2 is an explanatory view of a method of inserting the regeneration pipe according to the present invention into the drain pipe.

FIG. 2 shows a method of inserting the regeneration pipe according to the present invention into the drain pipe 1.

In the case of the drain pipe configured such that one end of the drain pipe 1 is connected to the left manhole 2 and another end thereof is connected to the right manhole 3, a rotary drum 6, around which a regeneration pipe 5 is wound, is disposed near an upper opening 2b of one of the manholes, more specifically, the left manhole 2 in the present embodiment.

In order to draw in the regeneration pipe 5, a drawing cap 7 is preliminarily attached to the tip of the regeneration pipe 5, and wire 8 drawn in through the other manhole 3 is connected to the cap 7. The wire 8 is wound up by driving a winch 9 that is placed near the manhole 3.

Accordingly, the regeneration pipe 5 unwound from the rotary drum 6 is inserted into the left manhole 2 through the upper opening 2b and is drawn into the drain pipe 1.

There is an alternative method of inserting the unwound regeneration pipe 5 into the drain pipe 1 by gradually pushing the regeneration pipe 5 into the drain pipe 1, without using the wire 8.

3. Configuration of Regeneration Pipe

Figure 3:
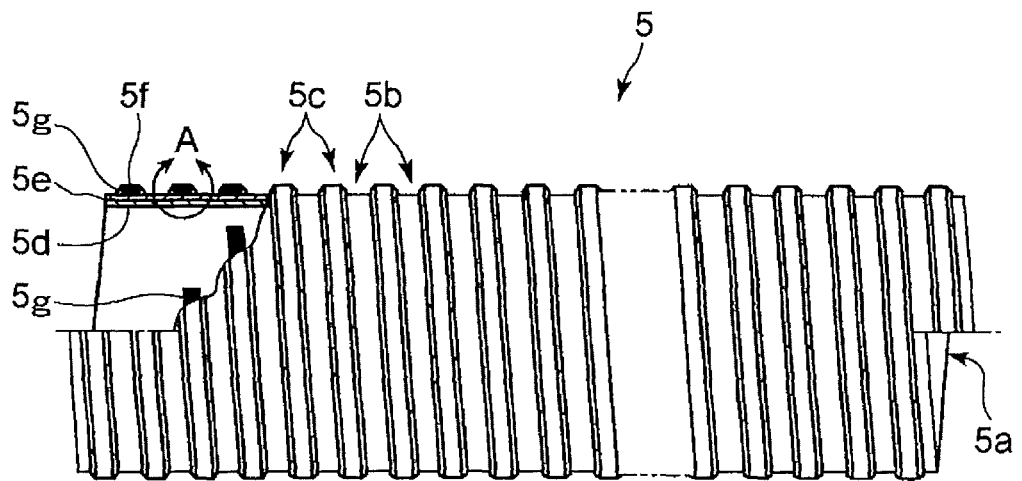
FIG. 3 is a front view having partially cutoff parts, showing the configuration of the regeneration pipe according to the present invention.

FIG. 3 is a front view showing the configuration of the regeneration pipe 5.

In this figure, the regeneration pipe 5 has a straight pipe part 5b and a protruded rim part 5c that is helically formed on the outer surface of the straight pipe part 5b. It is possible to use a pipe having an outer diameter of 150 to 450 mm, an inner diameter of 135 to 435 mm, a helical pitch of 12 to 18 mm, a height of a core in the protruded rim part 5c being 6 to 9 mm, and a width of the core being 6 to 13 mm.

As to the helical pitch and the width of the core, the regeneration pipe is hard to be bent if the helical pitch is too narrow, while the strength of the regeneration pipe is deteriorated if the helical pitch is too wide. Therefore, in order to provide appropriate bendability and strength, the width of the core is preferably set in the range from 50 to 70% of the helical pitch. For the reason same as the above, it is preferred to set the thickness of the regeneration pipe 5 in the range from 10 to 30% of the height of the core.

The straight pipe part 5b is configured by an inner wound flexible resin layer 5d and an outer wound flexible resin layer 5e. The protruded rim part 5c, which is configured by a core-covering part 5f and a rigid-resin core 5g, is wound to be laminated on the outer surface of the outer wound flexible resin layer 5e.

Figure 5:
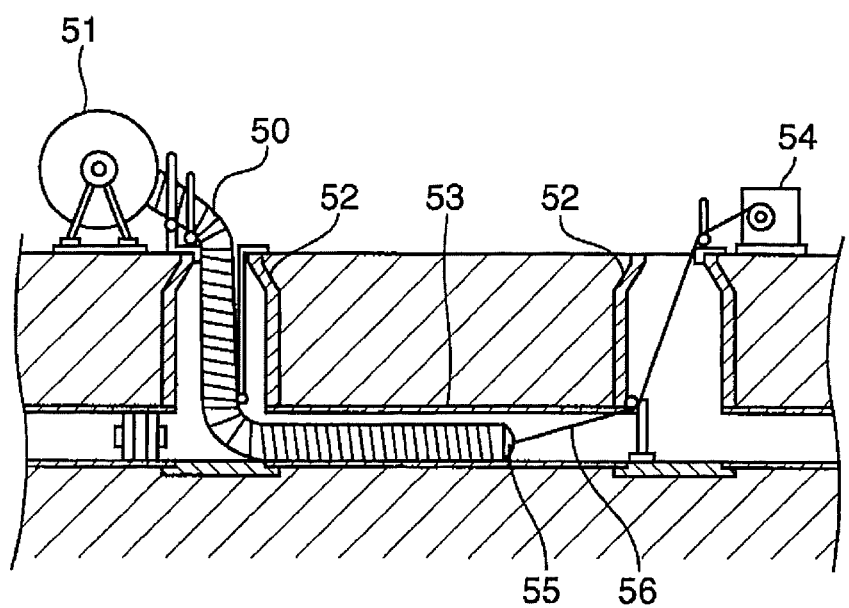
FIG. 5 is an explanatory view of a method of constructing a conventional regeneration pipe.

While the regeneration pipe 5 is similar to a known corrugated pipe in outer appearance, the regeneration pipe 5 according to the present invention is optimized in terms of the material therefor, as to be described later. Therefore, as having been described with reference to FIG. 5, neither the gap between the existing pipe and the regeneration pipe 5, nor the helical groove provided on the entire periphery in the entire length of the regeneration pipe 5, is required to be grouted, but it is sufficient to grout only the inlet part of the regeneration pipe 5.

Figure 4:
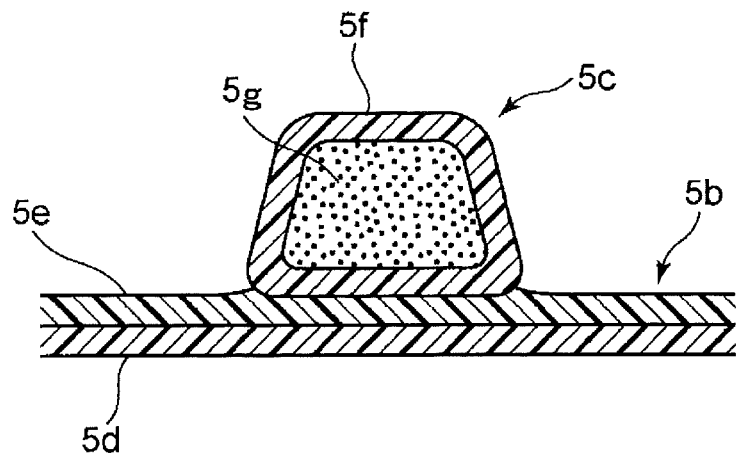
FIG. 4 is an enlarged view of an A part indicated in FIG. 3.

FIG. 4 shows an enlarged A part, which is indicated in FIG. 3.

3.1 Inner Wound Flexible Resin Layer

In FIG. 4, the inner wound flexible resin layer 5d can be made of thermoplastic resin having excellent chemical resistance, such as vinyl chloride resin, polyolefin resin, or thermoplastic elastomer of olefinic series or styrene series, for example. In a case where oil resistance is required, the inner wound flexible resin layer is preferably made of LLDPE (linear low-density polyethylene).

3.2 Outer Wound Flexible Resin Layer

The outer wound flexible resin layer 5e can be shaped with use of thermoplastic resin having good adhesiveness to the inner wound flexible resin layer 5d and excellent chemical resistance, such as thermoplastic elastomer of styrene series, olefinic series, nylon series, polyester series, polyamide series, polystyrene series, or the like. In a case where long-term reliability and weather resistance are also required, it is preferred to use thermoplastic elastomer of hydrogenated styrene series, more specifically, SEBS (styrene-ethylene/butylene-styrene block copolymer).

It is more preferred to blend olefinic resin with thermoplastic elastomer mentioned above, because internal pressure, external pressure, flatness strength, compressive strength, and tensile strength can be improved.

SEBS mentioned above may be acid denatured SEBS or amine denatured SEBS. Examples of olefinic resin mentioned above include PP and PE.

The outer wound flexible resin layer made of resin of this type is excellent in heat resistance.

3.3 Core-Covering Part

The core-covering part 5f is made of a material same as or similar to that for the outer wound flexible resin layer 5e. The core-covering part is cylindrically shaped in the process of producing the regeneration pipe 5, and is heat-sealed to the outer wound flexible resin layer 5e upon being helically wound around the outer surface of the outer wound flexible resin layer 5e so as to be integrated therewith.

3.4 Core

The rigid-resin core 5g is made of any one of PPS (polyphenylene sulfide), PEI (polyetherimide), PAR (polyarylate), PES (polyethersulfone), PEEK (polyether ether ketone), PTFE (polytetrafluoroethylene), PET (polyethylene terephthalate), PBT (polybutylene terephthalate), PA (polyamide), POM (polyacetal), saturated polyester, and polymer blends thereof. The rigid-resin core 5g is extruded into a bar shape, and is surrounded with the cylinder of the core-covering part 5f in the process of cylindrically shaping the core-covering part.

PPS as an exemplary material therefor is highly heat-resistant engineering plastic that has high heat resistance, strength, rigidity, and excellent dimensional stability as well as excellent shaping processability as thermoplastic resin. PPS has been conventionally used as a substitute for metal or thermosetting resin in many cases. In the present invention, PPS is used in the core of the regeneration pipe for regenerating a drain pipe.

The rigid-resin core 5g made of PPS has extremely poor absorbency and is slightly changed in dimension by absorption, so as to exert excellent dimensional stability. In addition, it is excellent in hydrothermal resistance.

The rigid-resin core 5g exemplified above can be further reinforced by means of a reinforcing material or a filler such as glass fiber, carbon fiber, aramid fiber, potassium titanate whisker, talc, mica, calcium carbonate, carbon black, hydrous calcium silicate, or magnesium carbonate.

Adhesiveness between the rigid-resin core 5g and the core-covering part 5f is not quite high because of difference in thermal property therebetween. However, the entire periphery of the rigid-resin core 5g is surrounded with the core-covering part 5f so as to be substantially integrated with the core-covering part 5f.

Examples of the rigid-resin core 5g include, in addition to PPS mentioned above, PPE (polyphenylene ether), PC (polycarbonate), aromatic nylon, PS, ABS resin, unsaturated polyester, PEI (polyetherimide), and polymer blends similar to these materials.

In the regeneration pipe 5 according to the present embodiment, the straight pipe part 5b is configured by the flexible resin layers. Therefore, the regeneration pipe 5 can be bent at necessary and sufficient curvature when being inserted from the rotary drum 6 into a manhole or being subsequently inserted from the manhole into the drain pipe 1, thereby facilitating the construction.

Furthermore, the regeneration pipe 5 including the rigid-resin core 5g at the protruded rim part has necessary rigidity, thereby constantly keeping the helical form.

Moreover, rigid resin is used in the rigid-resin core 5g to enhance flatness strength thereof. Accordingly, upon inserting the regeneration pipe into the existing drain pipe 1, there is no need to grout the gap between the drain pipe 1 and the regeneration pipe or the helical groove provided on the entire periphery in the entire length of the regeneration pipe 5. Therefore, a new drain pipe can be formed in the existing drain pipe by means of only the regeneration pipe 5.

The core-covering part 5f surrounding the rigid-resin core 5g is made of a material same as or similar in thermal action to that for the outer wound flexible resin layer 5e, so as to be integrated with the outer wound flexible resin layer 5e. Therefore, the rigid-resin core 5g can be reliably wound around the outer surface of the straight pipe part 5b of the regeneration pipe 5 so as to be integrated with the straight pipe part 5b.

Although the present invention in connection with the preferred embodiment has been fully described with reference to the accompanying drawings, the present invention can be embodied with modification and revision in various manners by those skilled in the art. Such modification and revision should be regarded as being included in the present invention unless departing from the technical scope of the present invention.

INDUSTRIAL APPLICABILITY

The present invention is applicable to cases of laying a new sewer pipe in a sewer pipe that has been buried in the ground and aged.

The invention claimed is:

1. A pipeline regeneration pipe comprising:
   an inner wound flexible resin layer configuring an inner layer of a straight pipe part;
   an outer wound flexible resin layer laminated on an outer surface of the inner wound flexible resin layer and configuring an outer layer of the straight pipe part; and
   a protruded rim part helically-formed on an outer surface of the outer wound flexible resin layer, wherein the protruded rim part is configured by a rigid-resin core helically wound, and a core-covering part in a tubular shape, and integrated with the outer wound flexible resin layer, so as to surround an entire periphery of the rigid-resin core,
   wherein the rigid-resin core is made of any one of PPS (polyphenylene sulfide), PEI (polyetherimide), PAR (polyarylate), PES (polyethersulfone), PEEK (polyether ether ketone), PBT (polybutylene terephthalate), PPE (polyphenylene ether), PC (polycarbonate), aromatic nylon, PS (polystyrene), ABS resin, and polymer blends thereof.

2. The pipeline regeneration pipe according to claim 1, wherein the inner wound flexible resin layer is made of low-density polyethylene or medium-density polyethylene.

3. The pipeline regeneration pipe according to claim 2, wherein the outer wound flexible resin layer is made of thermoplastic elastomer blended with olefinic resin.

4. The pipeline regeneration pipe according to claim 2, wherein the rigid-resin core is made of any one of PPS (polyphenylene sulfide), PEI (polyetherimide), PAR (polyarylate), PES (polyethersulfone), PEEK (polyether ether ketone), PBT (polybutylene terephthalate), and polymer blends thereof.

5. The pipeline regeneration pipe according to claim 4, wherein the core-covering part is made of a material which is the same as that for the outer wound flexible resin layer.

6. The pipeline regeneration pipe according to claim 1, wherein the outer wound flexible resin layer is made of thermoplastic elastomer blended with olefinic resin.

7. The pipeline regeneration pipe according to claim 6, wherein the core-covering part is made of a material which is the same as that for the outer wound flexible resin layer.

8. The pipeline regeneration pipe according to claim 6, wherein the rigid-resin core is made of any one of PPS (polyphenylene sulfide), PEI (polyetherimide), PAR (polyarylate), PES (polyethersulfone), PEEK (polyether ether ketone), PBT (polybutylene terephthalate), and polymer blends thereof.

9. The pipeline regeneration pipe according to claim 8, wherein the core-covering part is made of a material which is the same as that for the outer wound flexible resin layer.

10. The pipeline regeneration pipe according to claim 1, wherein the rigid-resin core is made of any one of PPS (polyphenylene sulfide), PEI (polyetherimide), PAR (polyarylate), PES (polyethersulfone), PEEK (polyether ether ketone), PBT (polybutylene terephthalate), and polymer blends thereof.

11. The pipeline regeneration pipe according to claim 10, wherein the core-covering part is made of a material which is the same as that for the outer wound flexible resin layer.

* * * * *